United States Patent [19]

Nash

[11] Patent Number: 4,771,438
[45] Date of Patent: Sep. 13, 1988

[54] METHOD AND APPARATUS FOR PHASE REFERENCE RECOVERY IN HIGH SPEED FAST TURNAROUND MODEM

[75] Inventor: Randy D. Nash, Dacula, Ga.

[73] Assignee: Hayes Microcomputer Products, Inc., Norcross, Ga.

[21] Appl. No.: 81,319

[22] Filed: Aug. 4, 1987

[51] Int. Cl.$^4$ .............................................. H03D 1/22
[52] U.S. Cl. ........................................ 375/15; 375/9; 375/39; 375/42; 375/78; 329/50; 329/146
[58] Field of Search ................... 375/9, 15, 39, 42, 78, 375/85, 86, 97, 118; 329/50, 105, 110, 135, 146

[56] References Cited

U.S. PATENT DOCUMENTS

| | | | |
|---|---|---|---|
| 3,955,141 | 5/1976 | Lyon et al. | 375/42 |
| 4,061,978 | 12/1977 | Motley et al. | 375/15 |
| 4,687,999 | 8/1987 | Desperben et al. | 375/39 |

Primary Examiner—Benedict V. Safourek
Attorney, Agent, or Firm—Jones, Askew & Lunsford

[57] ABSTRACT

A fast phase reference recovery apparatus for use in a data communication system employing a signal constellation which is variant for certain rotations which will produce local minima in the phase error signal output of a phase lock loop. The incoming signal is rotated by one or more phase shifting networks, the outputs of which are provided to constellation decision circuits for the constellation in use. One of the constellation decision circuits will be locked on to the correct local minimum and thus on to the proper phase constellation, and the others will be locked onto incorrect rotations of the constellation. The magnitudes of the errors produced by the constellation decision circuits are compared and selection of the data signals from the proper circuit is made based on the relative magnitudes of these error signals. In preferred forms, the comparison of the magnitudes of the error signals is averaged over a predetermined number of baud times to improve reliability. The apparatus is self-locking on to the proper phase reference without the use of training or synchronization sequences.

19 Claims, 4 Drawing Sheets

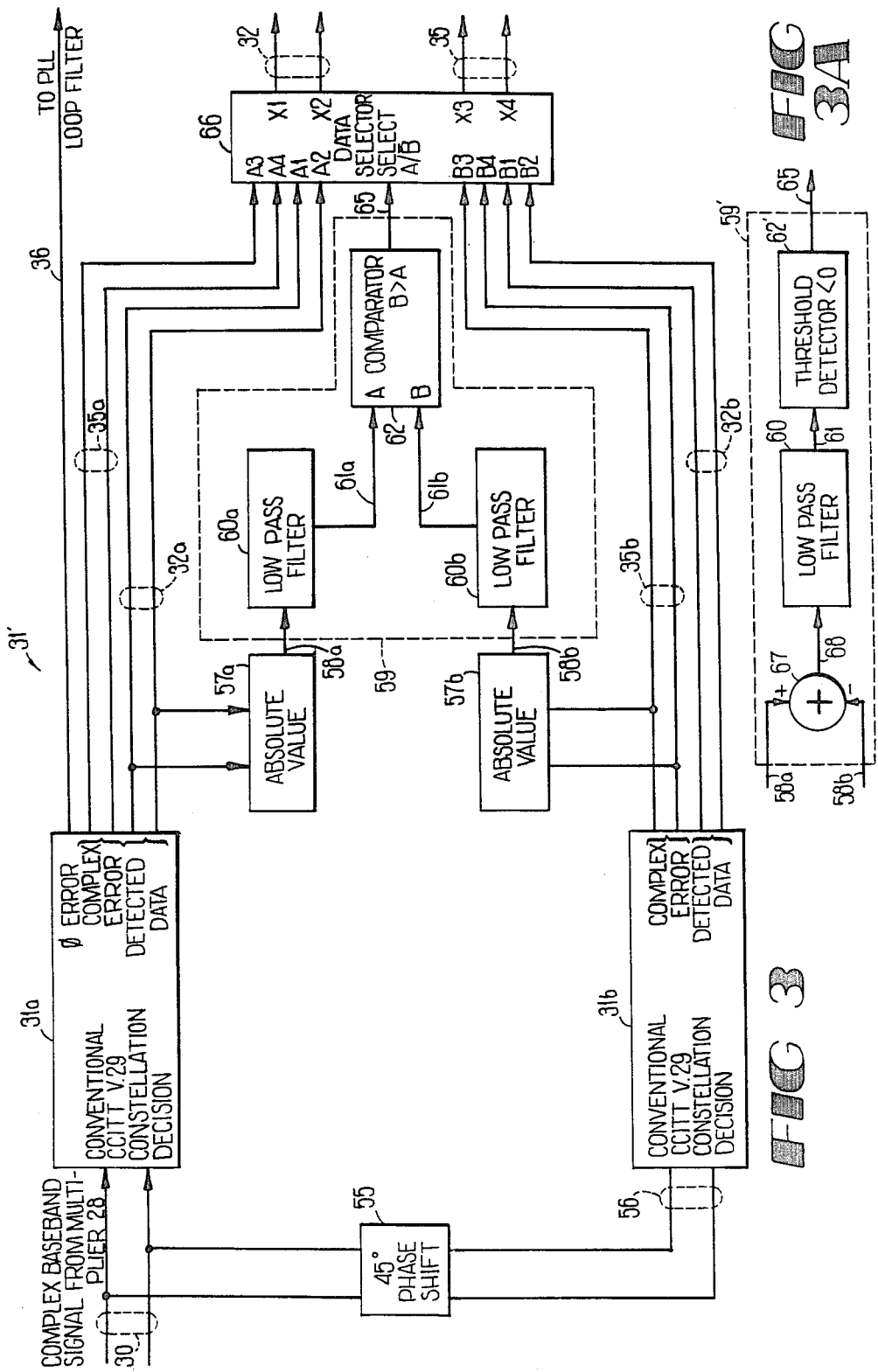

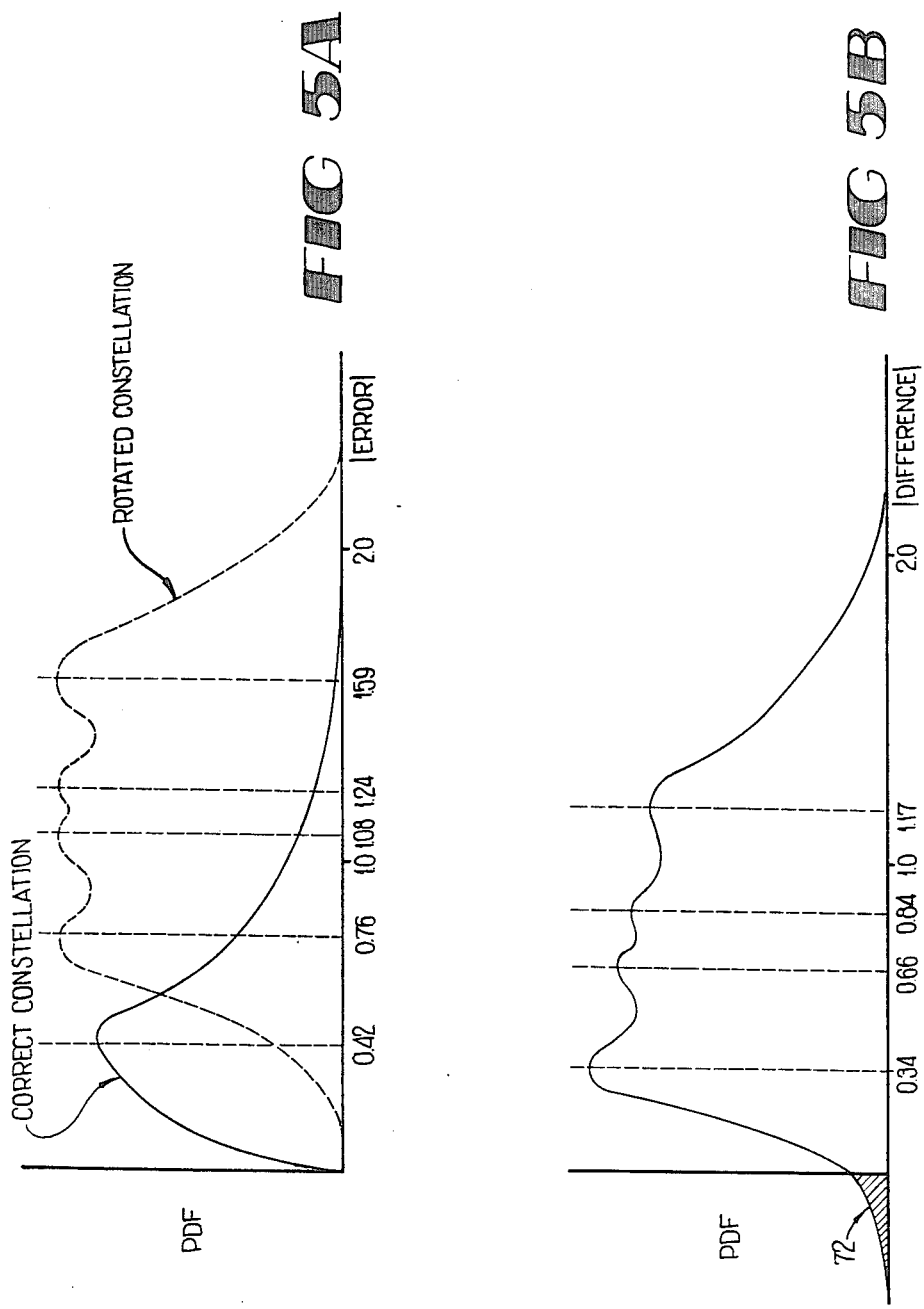

METHOD AND APPARATUS FOR PHASE REFERENCE RECOVERY IN HIGH SPEED FAST TURNAROUND MODEM

TECHNICAL FIELD

The present invention relates to the field of data communications systems employing phase and amplitude modulation encoding techniques and more particularly is an improved method and apparatus for rapidly recovering the proper phase reference for certain signal constellations for which conventional phase locked loop circuits can lock onto two or more local minima of the phase error signal.

BACKGROUND OF THE INVENTION

The present relates to phase reference recovery circuits for use in high speed modems with a relatively complex phase/amplitude signal constellations. As is known to those skilled in the art, medium and high speed modems encode data by selectively varying the phase of a transmitted carrier signal with respect to a reference phase. Most popular medium to high speed encoding schemes use some form of differential phase shift key (DPSK) encoding wherein the differential phase shift between two successive baud times encodes the data bits to be transmitted. Therefore, there is no need for an absolute phase reference in order to properly encode data, once communication is established since it is only the relative phase shift between successive baud times that is important to the decoding process.

For modems usable on conventional voice grade telephone lines, or other band limited communication channels, such as leased telephone lines, there are upper limits on the keying rate for phase shift keyed modems. In other words, as the $d\phi/dt$ characteristics of the signal increase, increased bandwidth is needed in order to get the information through the channel.

As is well known to those skilled in the art, higher speed modem signaling schemes have generally adopted a combination of phase and amplitude modulation to encode data. Therefore, in higher speed modem signaling schemes intended for use on bandwidth limited channels, both the relative change in phase and the relative change in amplitude between successive keyings of the transmitter (baud times) are significant in determining the data transmitted.

Several encoding schemes for transmitting data at 9600 bits per second over telephone lines employ 16 point phase/amplitude signal constellations for encoding 4 bits per baud time. As the complexity of the signal constellation increases, the complexity of the receiver circuitry necessary to properly receive and decode the transmitted signal increases.

Most conventional higher speed modem receiver circuits employ the well known phase locked loop to lock on to an appropriate relative phase of the incoming signal in order to compensate for phase jitter in the received signal and to maintain the ability to receive the signal under conditions of relatively low signal to noise ratio. Also, PLL receiver circuits are very useful in offsetting the effects of frequency drift and offset from the specified carrier frequency which are often encountered under practical conditions.

The present invention is particularly directed to modems adopting encoding schemes which have signal constellations for which the phase and amplitude changes between successive baud times are significant for encoding the data and for which phase lock loop circuits can converge on more than one local minimum. A particular species of such a modem is one conforming to CCITT specification V.29. Conventional modems which use such constellations employ a training sequence, such as that specified in CCITT specification V.29, to allow the receiver of each modem to determine whether the phase lock loop circuit has locked onto the correct local minimum in its error signal in order to decode data. This requires a predetermined handshaking and training sequence in which two modems each transmit a predetermined training sequence to allow the receiver of the other modem to cause its PLL circuit to lock onto the correct local minimum. For example, the training sequence specified in V.29 takes approximately 253 milliseconds, or approximately one quarter second.

In operations of such modems, whenever synchronization is lost due to noise on the line, or some other error, the modem which detects loss of synchronization must request a retraining sequence from the modem with which it is communicating. Data communication must stop, and a lengthy retraining sequence, as described above, must be re-executed in order to reestablish proper communication. As will be apparent to those skilled in the art, this conventional arrangement renders modems employing the above described type of signal constellation impractical for fast turnaround half duplex operation. As is known to those skilled in the art, fast turnaround half duplex operation is a mode of operation of a modem in which the modems actually operate in a half duplex mode, i.e., only one modem is transmitting at any given time. The fast turnaround mode of operation is one in which the pair of modems rapidly switch their modes of operation between transmit and receive. In other words, the direction of communication, for example from modem A to modem B, turns around quickly to communication from modem B to modem A in such devices.

The main purpose of fast turnaround modems is to allow high speed digital communication at high bit rates between a pair of modems with the following operational features: (a) the modems, in many applications, appear to be full duplex to the users; and (b) each modem can occupy all of the available useable bandwidth of the communication channel since the system is half duplex.

For modems designed to be used on information channels with relatively narrow available bandwidth, fast turnaround modems can approximate the performance of full duplex modems operating at the same bit rate for many applications. The advantage of using half duplex operation is that simpler and less expensive signal processing circuits can be used in the receiver, and a greater noise immunity is achieved, as compared to high speed full duplex communication schemes, such as that specified in CCITT Recommendation V.32.

As is known to those skilled in the art, fast turnaround high speed modems can mimic the performance of full duplex modems operating at the same bit rate in many applications. For example, if a user at a terminal is working with a database at a remote computer, relatively little information needs to be transmitted from the terminal to the database computer. So long as the modems turn around with sufficient rapidity, the communication system will appear to the user, as a practical matter, to be operating as if it were a pair of 9600 bit per second full duplex modems.

At least one study has provided quantitative data concerning the perception of a terminal user in the circumstance described immediately above. If the criteria are met, communication over a data link connected by two half duplex fast turnaround modems will appear to the interactive terminal user to be the same as full duplex communication. The design criteria in question is the maximum delay between the time the user operates a key at a terminal keyboard and the time that the character is echoed back to appear on the screen of the user's terminal. The study referenced above found that as long as this delay does not exceed 200 milliseconds, the communication link will appear to the user to be full duplex in nature.

As is known to those skilled in the art, most data communication schemes between terminal devices and host computers use character echoing arrangements. In a character echoing communication scheme, the transmission of a character from a terminal device sends the character to the host computer which both receives and processes the character according to the program it is running, and transmits the character back over the data communications link to the terminal. It is receipt of the character back from the host computer at the terminal, which causes the character to appear on the screen. This arrangement has been standard for many years because, inter alia, it allows the terminal user to have some confirmation of the receipt of the data he or she is sending by the host computer.

In most full duplex data communications schemes, the round trip delay between key operation and appearance of the character on the screen is much less than 200 milliseconds.

The above noted study determined that once the delay between key stroke operation and the appearance on the screen of the echoed back character exceeds 200 milliseconds, users begin to detect the intervening delay, and thus the half duplex operation of the system. It will be quickly appreciated that use of conventional training sequences of the type described in CCITT Recommendation V.29 simply cannot meet this criteria. Since the training sequence specified in Recommendation V.29, by itself, exceeds 200 milliseconds, the conventional approach to this type of communication cannot be used to implement a modem meeting the above cited design criteria.

Therefore, there is a need in the art to provide a modem receiver usable in a relatively complex phase-/amplitude signal constellation communication scheme, which can avoid the necessity of relatively long training sequences. In particular, it is preferable if such training sequences could be reduced by approximately an order of magnitude.

SUMMARY OF THE PRESENT INVENTION

The present invention provides a phase reference recovery circuit which fills the above stated need. Generally stated, the present invention provides a phase constellation decision circuit which employs a duplication of conventional constellation decision circuits. One of the two decision circuits is fed with the baseband data signal input and the other is fed with the baseband data signal input shifted by a predetermined angle, 45 degrees in the preferred embodiment. The angle of the phase shift used is dependent upon the symmetry of the signal constellation. The amplitude of the error signal from each decision circuit is measured and the relative values of the two amplitude error signals are used to select the output of one of the conventional decision circuits to be applied to the data decoder, and, preferably, a conventional adaptive equalizer.

A phase error signal is selected from an arbitray one of the two conventional constellation decision circuits and provided to the loop filter of the receiver's phase locked loop. It makes no difference which of the two signals is used as the source of the phase error signal for the loop filter, since the only important aspect is that the loop remain locked on one of the possible local minima. The balance of the present invention takes care of compensating for loop lock on a correct constellation or a rotated constellation.

In the preferred embodiment, the amplitude error signal from each of the conventional decision circuits is lowpass filtered, and the lowpass filtered output of each amplitude error signal is applied to a comparator, the output of which selects the signals applied to the rest of the receiver circuits. A particular one of the possible sets of complex error signals is applied to the receiver's adaptive equalizer and the particular one of the detected data outputs is also applied to the differential data decoder.

As described in greater detail hereinbelow, the probability of an incorrect decision can be reduced to an acceptable level in under ten baud times after the receiver's phase lock loop has achieved lock on a local minimum. Therefore, it will be appreciated that the present invention constitutes a trade off essentially comprising duplication of convention constellation decision circuitry in exchange for very rapid phase reference recovery which allows for practical implementation of fast turnaround modems employing signal constellations of the type described hereinabove.

In addition to fast phase reference recovery upon startup, the present invention also provides accurate phase reference recovery "in real time" even if a noise event in the communication channel causes the receiver's PLL to lose lock. As noted above, prior art modems using constellations of the type described require that the modem receiver which lost lock on an incoming data signal to terminate reception of data and request a retraining or resynchronization sequence. Use of the present invention in a modem receiver provides automatic reacquisition of the proper phase reference in a time period no greater than the lock time of the loop plus 5 to 10 baud times. As a practical matter, phase lock loops establish lock more quickly when they are momentarily driven from a locked condition and thus the circuit allows reestablishment of proper phase reference recovery in a short period of time. While there will be an error burst under such conditions, there is no requirement that the receiver circuit terminate reception and request a retraining sequence.

It is an object of the present invention to provide a rapid phase reference recovery circuit usable in data communication systems employing signal constellations which exhibit two or more local minima to a phase lock loop in the receiver circuit.

It is a further object of the present invention to provide a phase reference recovery circuit in a modem which constantly operates to provide the appropriate phase reference to the receiver circuit without using lengthy training sequences.

It is still a further object of the present invention to provide a phase reference recovery circuit in a modem employing the conventional CCITT V.29 signal constellation which may be used in practical implementations of 9600 bit per second fast turnaround modems.

That the phase reference recovery circuit of the present invention meets the foregoing objects, and fulfills the above noted need from the prior art, will be appreciated by the detailed description below.

BRIEF DESCRIPTION OF THE DRAWINGS

FIG. 3 is a block diagram of the preferred embodiment of the improved high speed phase reference detector of the present invention.

FIG. 3A is an alternate embodiment for the comparator circuit shown in FIG. 3.

FIG. 5A shows graphs of the probability density functions for the error signals from a decision circuit locked onto the correct signal constellation and a decision circuit locked onto a rotated signal constellation.

FIG. 5B is a graph of the probability density function of the difference between the error signals for the correct and rotated signal constellation.

DETAILED DESCRIPTION

Figure 1:
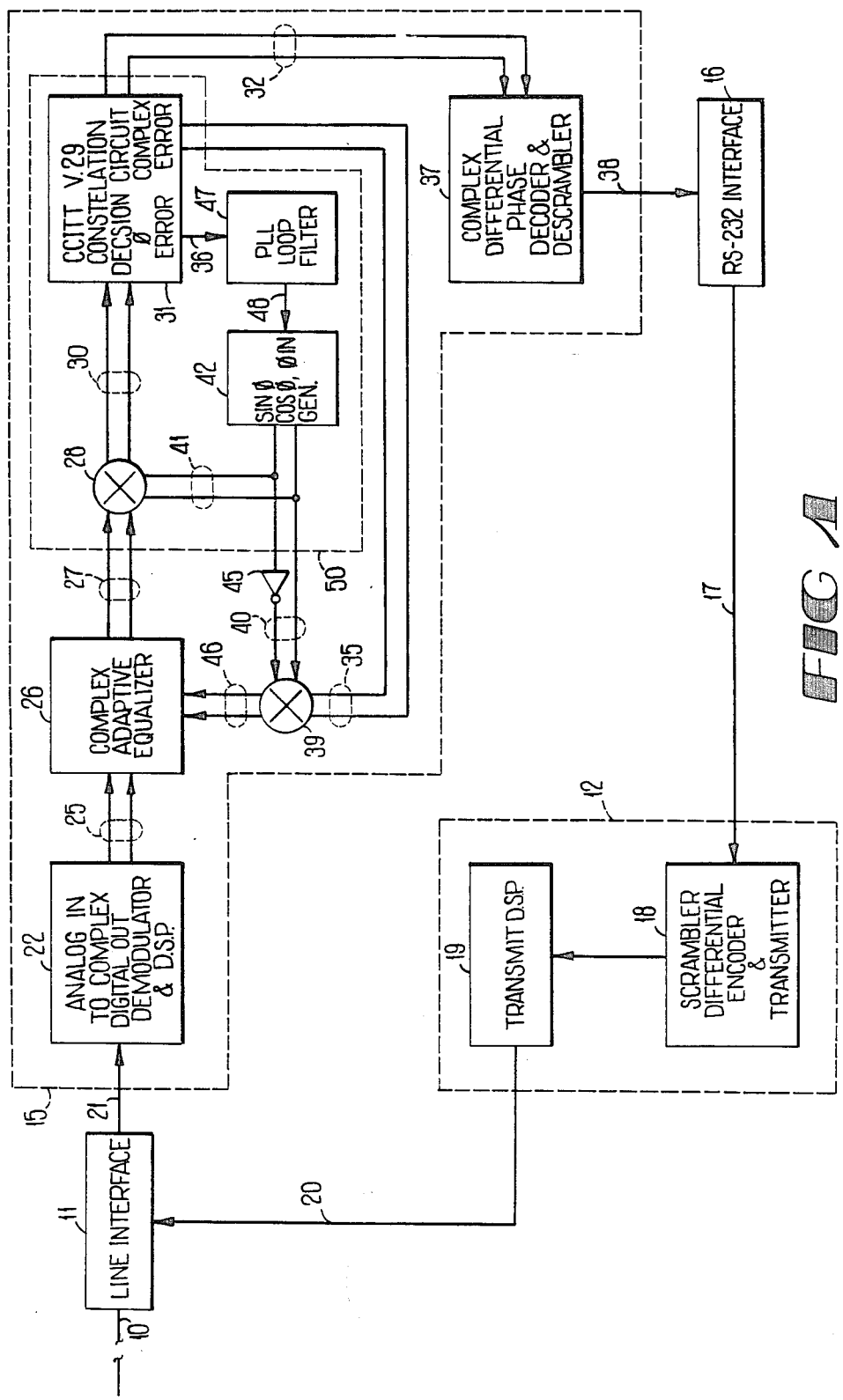
FIG. 1 is a block diagram representing both a conventional CCITT V.29 modem and a modem using the preferred embodiment of the present invention.

Turning now to the drawing figures, in which like numerals represent like elements, the preferred embodiment of the present invention, and the signals to which it responds, will now be described.

FIG. 1 shows a block diagram of a modem implementing Recommendation V.29 of the International Consultive Committee for Telephone and Telegraph (CCITT) published in the 1981 "yellow books" collection of CCITT Proceedings and Recommendations. In particular, Recommendation V.29 appears in Volume VIII.1. Throughout the specification, any further references to specific pages or tables in Recommendation V.29 refer to the recommendation as printed in Volume VIII.1 of the 1981 yellow books. The CCITT yellow books, and the recommendations and standards contained therein, will be quite familiar to those of ordinary skill in the art and are hereby incorporated by reference.

As will become apparent from the following description, FIG. 1 also serves as a block diagram of a modem embodying the preferred embodiment of the present invention when particular circuit details, described in connection with FIG. 3 hereinbelow, are included.

The modem of FIG. 1 is designed to be connected to a voice grade telephone line 10 through a line interface 11. Generally speaking, the modem includes a transmitter section, shown surrounded by dash line 12, and a receiver section shown surrounded by dash line 15 on FIG. 1. Transmitter and receiver sections 12 and 15 are both connected to an RS-232 interface 16 through which the modem is connected to data terminal equipment. Data to be transmitted by the modem is received at RS-232 interface 16 and transmitted over line 17 to block 18. Block 18 is labeled as a scrambler, differential encoder and transmitter. This represents circuit elements implementing well known scrambler and differential encoder functions, together with appropriate circuitry for providing output signals to transmit digital signal processing block 19. The output from transmitter 18 is provided to a block labeled transmit DSP (digital signal processing), the output of which appears on line 20 which carries it to line interface 11. Implementations of the scrambler, transmit digital signal processing functions, represented at 19, and the differential encoder and transmitter, represented at 18, are well known to those skilled in the art and are not described in detail herein. Additionally, these elements do not, per se, form a part of the present invention. They are described herein so that the environment of the present invention will be fully understood.

The elements surrounded by dash line 15 constitute the receiver of either a conventional modem or one embodying the present invention. The receiver as depicted in FIG. 1 is conventional in nature. The output from line interface 11 is provided on line 21 to an analog-to-digital converter 22. Analog-to-digital converter 22 includes conventional demodulation and digital signal processing circuits or functions. As will be well known to those skilled in the art, these functions include demodulation of the passband signal down to a baseband signal representing the modulated data which was applied to the carrier signal by the transmitting modem. It also include appropriate digital signal processing circuits to convert the baseband signal to a digital complex representation of an analog baseband signal. In the preferred embodiment of the present invention, the signals on line pair 25 represent I and Q components of the input signal, when referenced to a predetermined reference phase in the received signal. As will be known to those skilled in the art, relatively complex digital signal processing circuits and algorithms are regularly used to generate digital representations of the complex I and Q components for a signal in a modem employing some form of phase shift keyed modulation. Thus, it will be understood that block 22 includes elements providing for clock recovery, sampling circuits, and the A to D conversions necessary to produce digital representations of the complex I and Q components. Implementations of this device are known to those skilled in the art.

It should be noted that use of the world "complex" in this specification, unless the context requires otherwise, refers to a mathematical representation of components of a signal in the mathematical complex plane rather than referring to the intricacy of any given device or signal. Except for the novel portions constituting the present invention, the conversion of signals from their analog form in the time domain to a representation in the complex plane with respect to a predetermined reference phase of a carrier, is a standard digital signal processing technique used in data communications. These standard techniques are employed throughout the modem in which the preferred embodiment resides and in elements of the preferred embodiment of the present invention itself.

The complex output on line pair 25 is provided as the input to complex adaptive equalizer 26, the output of which appears as complex I and Q signal components on line pair 27. The adaptive equalizer 26 in the modem of FIG. 1 is a conventional digital adaptive equalizer used to compensate for noise conditions and nonlinearities in the transmission path constituting the path from the remote sending modem through line 10 and elements 11 and 22 shown in FIG. 1. The output from complex adaptive equalizer 26 is an equalized complex baseband signal having I and Q components which appear on line pair 27. This signal is provided to complex multiplier 28, the output of which appears as a modified complex baseband signal on line pair 30.

The modified complex baseband signal appearing on line 30 is provided as inputs to conventional CCITT V.29 constellation decision circuit 31. The operation of decision cicuit 31 will be described in somewhat more detail in connection with FIGS. 2,3 and 4. Suffice it to say that block 31 represents the apparatus which analyzes the values of the I and Q components of the baseband signal on line pair 30 and determines the particular one of the set of signal constellation points which is closest to the point represented by the I and Q values on line pair 30. In other words, decision circuit 31 calculates the mathematical distance, in a phase plane representation of the received signal point represented by the values on line pair 30, to various points in the signal constellation in close proximity to the detected point. It then makes a decision as to which of the constellation points is closest to the received point, and thus determines that the received point represents a transmission of the particular nearest constellation point.

Naturally, when all things are going well, the location in the phase plane of the received point represented by the values on line pair 30 will be very close to one of the constellation points, and the decision can be made with a very high level of confidence.

At this point, it should also be noted that the preferred embodiment of the present invention per se constitutes a modification of constellation decision circuit 31, which is described in greater detail hereinafter in connection with FIG. 3. The point is that the modem shown in FIG. 1 represents a conventional modem when a conventional constellation decision circuit is used to embody block 31, and the modem represents an improved modem employing the present invention when the modified decision constellation circuit shown in FIG. 3 is used.

As is known to those skilled in the art, the conventional implementations of constellation decision circuit 31 are made employing high speed digital signal processing circuits, often embodied on VLSI integrated circuits. Therefore, it should be understood that all the blocks within receiver 15 of FIG. 1 may be, and commonly are, implemented through the use of high speed and high powered digital signal processing chips, often in conjunction with a microprocessor acting as a master controller for the modem shown in FIG. 1. It should therefore be understood that constellation decision circuit 31 is not necessarily a "separate circuit" but may also represent a functional block of an overall digital signal processor operating on the received input on line 21.

Continuing with the description of the modem of FIG. 1, decision circuit 31 provides three outputs which appear on line pairs 32 and 35, and line 36. The output on line pair 32 is a complex representation of the detected data point from constellation decision circuit 31. In other words, the I and Q values on line 32 will represent a particular constellation point which the decision circuit 31 determined was the closest constellation point to the point represented by the signals on line pair 30. The complex error signal which appears on line pair 35 is a complex representation of the vector difference, in the phase plane, between the received data point in the phase plane (after equalization) which appears on line pair 30 and the detected point in the constellation itself, as represented by the signals on line pair 32. The signal on line 36 is a scaler representation of the phase angle of the error signal which is used by the receiver's phase lock loop. As will be understood by those skilled in the art, the information on line 36 can be derived from the complex error signal on line pair 35. The complex representation of the detected signal and the constellation point is provided to complex differential phase decoder 37 which, in a conventional manner, provides detected data out on line 38 in response to the complex representation of the detected received data on line pair 32.

As noted above, the modem of FIG. 1 (which represents both a conventional modem and a modem employing the preferred embodiment of the present invention) is adopted to use the signal constellation for 9600 bit per second communication defined in CCITT Recommendation V.29. As is known to those skilled in the art, this is a 9600 bit per second differential communication scheme which encodes four bits per signal time or baud time. The V.29 communication scheme, like most phase shift keyed modem conventions, is a differential data encoder and decoder. Therefore, the actual bits of data are represented by the difference between two encoded signals in two successive baud times.

It should therefore be understood that differential phase decoder 37 will, in response to receipt of any complex representation of a detected constellation point on line pair 32, undertake the following action. Decoder 37 stores the value for the most recently received previous data point in memory. It then determines the particular constellation point represented by the new detected signal on line pair 32. Outputs representative of the difference between these two detected points are applied to a look-up table and a 4 bit nibble representing the 4 bits encoded by the phase and amplitude change between the two successive data points are then clocked out onto line 38 in a serial manner.

The complex error signal on line pair 35 is provided to a second multiplier 39 which has its other input connected to line pair 40. Line pair 40 carries the same signal as line pair 41 from the output of sine/cosine generator 42 except that the sine component is inverted by inverter 45.

Inverter 45 inverts the sine component of the complex signal which appears on line pair 41. Since the sine component represents the Y axis, or imaginary part, of the number in question, line pair 40 carries the complex conjugate of the output of sine/cosine generator 42, which is multiplied by the complex error signal on line pair 35 by multiplier 39. The result of this computation appears on line pair 46 as the second input to adaptive equalizer 26. This operation decouples the action of the phase locked loop from the adaptive equalizer.

As will be recognized by those skilled in the art, the element surrounded by dash line 50 in FIG. 1 constitute the digital phase lock loop of receiver 15. The scaler phase error signal on line 36 is provided to phase lock loop filter 47, the output of which is provided on line 48 as the input to sine/cosine generator 42. It will be appreciated that only the portion of constellation decision circuit 31 which actually provides the phase error signal on line 36 constitutes a part of the loop.

The use of phase lock loops, both digital and analog, is common in phase shift keyed modems. These circuits are extremely efficient in locking onto the carrier of an incoming signal, even in the presence of relatively high noise in the communications channel, and detecting phase shifts in the received signal. Thus, it is a modern day practical requirement that phase lock loops be employed in the receiver circuits of modems for transmitting relatively high data rates over relatively narrow bandwidth channels, such as voice grade telephone lines.

It is a combination of the well known action of phase lock loops, the symmetry of the V.29 constellation (and similar signal constellations) and the fact that V.29 specifies an absolute phase reference, which gives rise to the problem solved by the present invention. As noted above in the background of the invention section of this specification, a receiver phase lock loop, such as loop 50, will lock on to a received signal for the V.29 constellation by either locking to the absolute phase reference, or a plurality of rotated versions of the constellation, each rotated in increments of 45 degrees with respect to the absolute reference. Because of this, CCITT Recommendation V.29 specifies a lengthy training sequence to allow the modem receiver to ascertain whether its phase lock loop has locked onto the minimum phase error signal resulting from a lock onto the correct constellation, or a rotated rendition of the constellation.

Figure 2:
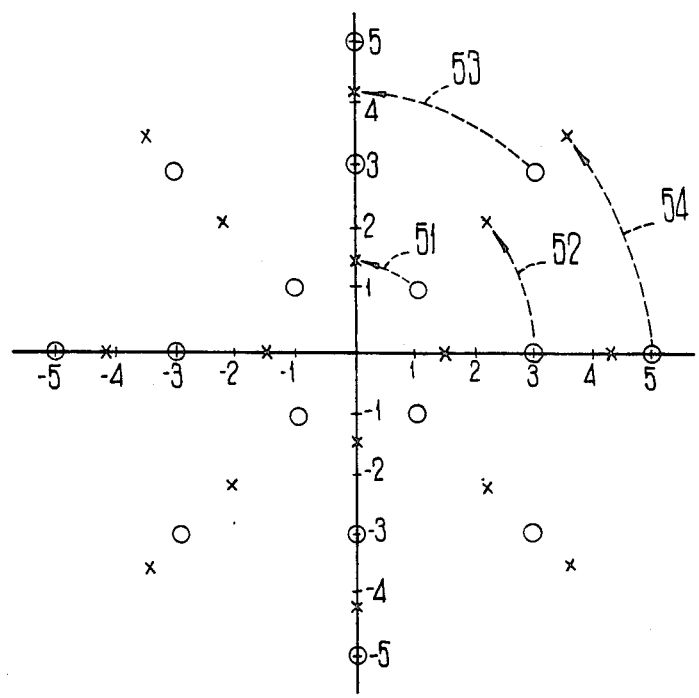
FIG. 2 is a phase/amplitude diagram of the signal constellation employed in the preferred embodiment, and the same signal constellation rotated 45 degrees.

Before proceeding to the preferred embodiment of the present invention, it may be helpful to describe the nature of the problem it solves in more detail. In connection therewith, reference is made to FIG. 2. FIG. 2 shows both the normal V.29 signal constellation and a version of the signal constellation rotated by +45 degrees. On FIG. 2, the points indicated by circles are the signal points of the correct, or normal, constellation. The points represented by an X on FIG. 2 are the points of the rotated constellation. The normal constellation is shown in FIG. 1/V.29 and described in Table 2/V.29 of CCITT Recommendation V.29. As set forth therein, the normal signal constellation points consist of the following signal points distributed symmetrically about the X and Y axes of the phase plane. On each axis there is a signal point at distance 3 and 5 from the origin. On four lines defined by bisectors of the axes in each quadrant, there are signal points at a distance $\sqrt{2}$ from the origin and 3 $\sqrt{2}$ from the origin. On FIG. 2, dashed lines 51 through 54 represent the sense of rotation of four signal points in the normal constellation to the corresponding signal points (marked with an X) in the rotated constellation.

From inspection of FIG. 2, and elementary analytical geometry, it will be appreciated that the rotated constellation consists of on axis points at distances $\sqrt{2}$ and 3 $\sqrt{2}$ from the origin and points on the bisector lines at distances 3 and 5 from the origin. Thus it will be appreciated that the 9600 b.p.s. signal constellation of Recommendation V.29 is invariant for rotations of increments of 90 degrees, but varies with rotations of N times 45 degrees, N an odd integer. From this, it will be appreciated by those skilled in the art that phase lock loop 50 (FIG. 1) will lock on to a local minima of the phase error signal generated by either the correct constellation or the rotated constellation shown in FIG. 2.

In order to compensate for this problem, modems using this constellation follow the recommendation of V.29 to transmit synchronizing signals described in Table 5/V.29 and Section 8 of Recommendation of V.29. One of the principal purposes of the present invention is to take advantage of signals which are already available in a modem of the type shown in FIG. 1, and with little added digital signal processing and parts overhead, allow a modem to retain a lock on the proper phase reference for the correct signal constellation shown in FIG. 2.

The preferred embodiment of the present invention, specifically usable to implement a fast turnaround modem using the V.29 signal constellation, is shown in detail in FIG. 3. On FIG. 3, the entire circuit is referenced generally by the designation 31'. This is to indicate that the elements shown on FIG. 3 are directly substitutable for block 31 shown in FIG. 1. It should be noted that line pair 30 provides the input to the improved phase reference detector and constellation decision circuit shown on FIG. 3. Likewise, line pairs 32 and 35, and line 36 are the outputs therefrom. With this in mind, the preferred embodiment of the present invention will now be described and the insight concerning the nature of the available signals will be described in connection with the remaining figures in this specification.

The input on line pair 30 is provided to a block labeled 31a which is a conventional CCITT V.29 constellation decision circuit. Reference numeral 31a was chosen to indicate that this block is identical to element 31 shown on FIG. 1, when FIG. 1 is taken to represent a prior art modem. The complex baseband signal on line pair 30 is also provided to a 45 degree phase shift network 55, the output of which appears on line pair 56. Line pair 56 provides input to a second conventional V.29 constellation decision circuit referenced as 31b. Decision circuits 31a and 31b duplicate the functions of a conventional V.29 constellation decision circuit represented in FIG. 1. The complex outputs from decision circuits 31a and 31b appear on line pairs 32a, 35a, 32b and 35b. Additionally, phase error signal line 36 is brought out from the upper constellation decision circuit 31a.

Taps to line pairs 35a and 35b provide the complex error signal to a pair of absolute value circuits 57a and 57b, respectively. Absolute value circuits 57 compute the magnitude of the complex error signal input to them, and provide this scaler quantity as an output on lines 58a and 58b, respectively. The absolute value inputs on lines 58 are passed as an input to comparator means 59 constituting a pair of lowpass finite impulse response (FIR) filters 60a and 60b. In the preferred embodiment, for reasons discussed hereinbelow, filters 60a and 60b have a transfer function equal to $$H(z) = \sum_{n=0}^{n=4} z^{-n}.$$

The outputs of filters 60a and 60b are provided on lines 61a and 61b as inputs to comparator 62. The output of comparator 62 appears on line 65. As noted on FIG. 3, the output on line 65 goes high when the signal on line 61b is greater than the signal on line 61a. Line 65 drives the input to a data selector 66 which has its A inputs connected to outputs from decision circuit 31a and its B inputs connected to the outputs of decision circuit 31b. The selected outputs from data selector 66 are provided on line pairs 32 and 35. From the foregoing it will be apparent that if the signal on line 61a is less than the signal on line 61b, then the signals from line pairs 32a and 32b will be routed to line pairs 32 and 35, respectively. If the opposite is true, then the signals from line pairs 32b and 35b will be routed to line pairs 32 and 35. Considering for a moment the significance of the signals described above, it will be appreciated that the apparatus shown on FIG. 3 selects the outputs from the particular one of constellation decision circuits 31a or 31b which, at any given time, is providing a complex error signal on its respective line pair 35a or 35b representing a magnitude in the complex plane which is less than the magnitude of the complex error signal from the other decision circuit. As the preferred embodiment of the present invention is part of a receiver for a modem employing digital processing, it will be appreciated that the phrase "any given time" in the preceding statement refers to for any particular baud time.

Detail FIG. 3A shows an alternative embodiment 59' for a comparator which may be substituted for the comparator means 59 in the circuit of FIG. 3. In the alternative for the comparator, an algebraic summing junction 67 accepts the inputs from lines 58a and 58b. The output of summing junction 67 appears on line 68 and is provided as an input to lowpass filter 60. Lowpass filter 60 is, in the preferred embodiment of the alternative of FIG. 3A, identical to either filters 60a or 60b shown in FIG. 3. The output from the filter appears on line 61 through a threshold detector 62' which simply operates as a comparator, comparing the signal on line 61 to a predetermined threshold value. The output on line 65 from the alternative comparator means of FIG. 3A goes high whenever the input on line 61 is less than zero. Thus it will be appreciated that the alternative of FIG. 3A provides an output signal on line 65 in response to input signals on lines 58a and 58b which is identical to that for comparator 59 shown in FIG. 3.

Turning next to FIGS. 2, 4, 5A and 5B, the insight which the inventor of the present invention had which led to the creation of this device will now be explained. First, it is appropriate to consider the normal and rotated constellations in FIG. 2 and how a modem receiver circuit responds to transmitted signals on an ideal communication channel with no noise. When the transmitting modem is using the normal constellation (as it will be as a practical matter) the complex error signal from a receiver locked onto the phase error signal generated by the normal constellation will be zero. This is because each detected point in the received signal, which traveled through an ideal channel, is detected as being exactly where it should be by the receiver.

Figure 4:
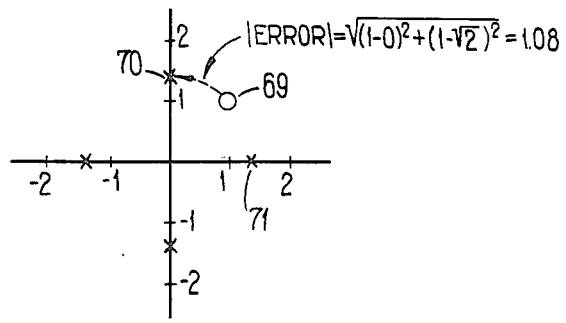
FIG. 4 is a detail of the rotated signal constellation and a transmitted data point which geometrically demonstrates an example of the magnitude of the error signals detected by the preferred embodiment.

Next, consider the situation in which the receiver is locked onto the rotated constellation and the transmitter is transmitting using the normal constellation. From this it will be appreciated that the constellation of circles on FIG. 2 represents the locations in the phase plane of the transmitted data points and the X's on FIG. 2 represent the receiver's constellation to which it will decode the received signals. FIG. 4 shows a detail of FIG. 2 near the origin for a specific example. Assume the conditions described above. Further assume that, for a particular baud time, the transmitting modem sends a signal of magnitude $\sqrt{2}$ at an angle 45 degrees from the positive X axis which is the absolute phase reference for V.29 9600 bit per second modem. This point is shown as point 69 in FIG. 4. The nearest points in the receiver constellation are points 70 and 71 which lie, respectively, at point $(0,\sqrt{2})$ and $(\sqrt{2},0)$. Since the example postulates an ideal signal channel, it will be apparent that transmitted point 69 is equidistance from receiver constellation points 70 and 71. As a practical matter, the quantitazation error and the algorithm of the decision circuit will determine which of the two points is selected as the decoded value for the transmitted point 69. Assume that it is point 70.

Elementary analytical geometry shows that the distance between the transmitted point 69 in the phase plane and the decoded point 70 has a magnitude of 1.08, and thus represents the magnitude of the complex error signal provided on line pair 35 (FIG. 1). Similarly, it should be appreciated that transmission of the four points which lie on the axes bisectors at a distance $\sqrt{2}$ from the origin will all be decoded to one of the receiver constellation points which lie on axis at a distance $\sqrt{2}$ from the origin. Therefore, for the four innermost points of the transmit constellation, the magnitude of the complex error signal generated by the receiver will be 1.08. Similar analysis may be applied to demonstrate that the transmitted points on axis at a distance 3 from the origin will be decoded to the receiver constellation points on axis at a distance $3\sqrt{2}$ from the origin and so forth. From this, it will readily be appreciated that the average magnitude of the error signal generated by receipt of a correctly encoded stream of data by a receiver locked onto the rotated constellation may be expressed as:

$$E[|\text{error}|]\ 1.59/4+0.76/4+1.24/4+1.08/4=1.17$$

As a matter of elementary probability and statistics, the variance of the error signal produced by a receiver locked onto the rotated constellation may be calculated as the difference between the expected value of the square of the magnitude of the error signal minus the square of the expected value of the magnitude of the error signal. The first term is calculated by:

$$E[|\text{error}|^2]=(1.59)^2/4+(0.76)^2/4+(1.24)^2/4+(1.08)^2/4=1.66$$

From this the variance of the error signal is calculated by:

$$\sigma^2=E[|\text{error}|^2]-E[|\text{error}|]^2$$

$$\sigma^2=1.66-(1.17)^2$$

$$\sigma^2=0.29$$

Thus, transmission through a jitter free noiseless channel produces a condition in which, for any given baud time, the magnitude of the error signal from a receiver locked onto the rotated constellation will always be greater than zero. The magnitude of the error signal from a receiver locked onto the correct constellation would be zero under these conditions.

Returning for a moment to FIG. 3, this principle may be applied to the phase reference recovery circuit shown thereon if we assume for the moment that decision circuit 31a is locked onto the correct constellation. Phase shift network 55 shifts the signal on line pair 56 by 45 degrees with respect to the signal on line 30. Thus, the input signals to decision circuits 31a and 31b will be such that one will be locked onto the correct constellation and the other will be locked onto the correct constellation. Continuing with the assumption, the output on line 58 from absolute value circuit 57a should be zero for the noiseless channel for each baud time. Similarly, the magnitude of the output on line 58b will always be greater than zero. Thus, the output on line 61b is greater than the output on line 61a which causes the output of comparator 62 on line 65 to go high, selecting the A inputs of data selector 66 to be routed to the outputs on line pairs 32 and 35. Inspection of the circuit and the foregoing discussion of same shows that indeed the outputs from decision circuit 31a, which is locked onto the correct constellation, will be provided on line pairs 32 and 35.

Note that the decision to provide the phase error signal on line 36 from decision circuit 31a is completely arbitrary. It is only important that once the proper phase reference is selected, that the same phase error signal be provided to loop filter 47 (FIG. 1) to maintain the PLL in a locked condition.

It will be readily apparent that if the assumption concerning which of decision circuits 31a and 31b is detecting the correct signal constellation is reversed, then the output on line 61b will be zero, with the output on line 61a being positive, causing line 65 to force data selector 66 to route the signals on its B inputs to its outputs.

Unfortunately, no ideal communication channels exist. Thus, the effect of Gaussian noise from the transmission path must be considered. For a practical implementation of a modem, the bit error rate should not exceed one in one hundred thousand (1 in $10^5$). Inspection of FIG. 2 shows that adjacent points lying at the same phase angle in the phase plane for the V.29 constellation are separated from each other by distance $2\sqrt{2}$. Therefore, it is apparent that the modem circuits are designed to tolerate noise for which the probability of the noise contribution exceeding the $\sqrt{2}$ (half the distance between adjacent points at a given phase angle) is less than or equal to $10^{-5}$. Gaussian noise meeting this requirement should be a worse case design specification for the other circuits in the modem.

The present analysis continues with the assumption that Gaussian noise meeting this criteria is present. From tabulated data, Gaussian noise of this level has a variance of 0.11. Since the random variable representing the Gaussian noise and the random variable representing the magnitude of the error signals from the correct and rotated constellations are independent, the effect on the magnitude of the error signal from the contribution of the Gaussian noise may be calculated in a straightforward manner. FIG. 5A shows the probability density functions for the magnitude of the error signals generated by receivers using the correct constellation and the rotated constellation in the presence of Gaussian noise with a probability less than or equal to $10^{-5}$ of having a magnitude greater than $\sqrt{2}$. The solid line on FIG. 5A is the probability density function of the magnitude error signal for the correct constellation and the dashed line represents the probability density function for the magnitude error signal generated by receiver using the rotated constellation. The probability density function (PDF) of the correct constellation has a Rayleigh distribution with a mean value of 0.42 and a variance of 0.047.

The probability density functions represented in FIGS. 5A and 5B are qualitative representations and not mathematically precise graphs. They fully and accurately illustrate the principles involved but are not intended to be precise representations of the probability density functions for the values described. However, the points of relative maxima on the graphs are correct and shown on the drawing figures.

From the mathematics of probability, it should be recalled that the probability that the value of a random variable is less than or equal to a given value X is given by the integral of the probability density function from zero to X (when the PDF=0 for all values less than zero). In other words, the area under the curves shown in FIG. 5A between the origin and any given value X of the magnitude of the error signal respresent the respective probabilities that the error signal for that particular constellation will have a value less than or equal to X. An intuitive inspection of FIG. 5A shows that a significant part of the area under the curve of the PDF for the correct constellation lies closer to the origin than that for the rotated constellation. From this, one can conclude that the rotated constellation receiver is more likely to produce an error signal of a given magnitude X than the correct constellation receiver.

While the foregoing is intuitively appealing, the statistically significant random variable is one which represents the difference between the magnitude of the error signal from the rotated constellation and the magnitude of the error signal from the correct constellation, both error signals being produced by a channel contaminated with the same Gaussian noise. Statistical analysis on the random variables represented in FIG. 5A indicates the following. The mean value of the different signal is 0.75. In other words, $E[|\text{error}_r| - |\text{error}_n|] = 0.75$, where error $_n$ represents the error signal from the receiver locked on the normal constellation and error $_r$ represents the error signal from the rotated constellation. Statistical analysis also shows that the difference of the magnitude error signals has a variance of 0.337. The probability density function for the difference in the magnitude error signal is shown in FIG. 5B.

From the foregoing it will be appreciated that, for a given received data point at a given baud time, the single most significant question to be answered is: what is the probability that the circuit of FIG. 3A will make an incorrect decision? The famous Tchebycheff inequality gives an upper bound for the probability that the circuit of FIG. 3A will make an incorrect decision. The Tchebycheff inequality states that the probability of a random variable having a value which deviates from its mean value by an amount greater than or equal to the mean value is less than the square of the variance of that random variable divided by its mean value. For the random variable of the difference in the magnitudes of the error signals, whose PDF is shown in FIG. 5B, there are substantially equal probabilities of the occurrence of a value of the random variable which exceeds the mean by a value greater than or equal to the mean, and an occurrence of the value of the variable which is less than the mean by a magnitude greater than or equal to the mean. Thus, from the Tchebycheff inequality, the probability that the difference error signals will be less than or equal to zero is one half of the square of the variance divided by the mean. Evaluation of this expression shows that the upper bound on the probability of the difference in the error signals being negative is less than or equal to 0.075.

Returning to FIG. 5B for a moment it should be appreciated that the probability of the difference in the error signals being negative is represented by the shaded area under the curve of the PDF shown at 72 in FIG. 5B. From inspection of FIG. 5B a normalized value for the shaded area is less than 0.075. However, by adopting the value given by the Tchebycheff inequality as a worse case, the following will become apparent. First, the probability of the difference of the magnitude error signals being less than zero in the presence of Gaussian noises at a particular baud time is independent of the same probability for the next baud time. Thus, if the decision concerning which circuit to choose is based on an average of the differences of the magnitude error signals over n successive baud times, the probability of making an incorrect decision will be less than or equal to $(0.22)^n$. If n is selected to be 5, the resulting probability of making an incorrect decision is less than or equal to $2.5 \times 10^{-6}$.

From this analysis, it follows that use of a digital lowpass finite impulse response filter of order 5 will have precisely this effect, that is, averaging over 5 baud times to produce the signal which drives data selector 66 shown in FIG. 3. Those skilled in the art will now understand why the transfer function of $$H(z) = \sum_{n=0}^{n=4} z^{-n}$$

was selected as the transfer function for filters 60, 60a, and 60b shown in FIGS. 3 and 3A.

Keeping in mind the graphical representation of the probability density function of the magnitude difference signals shown in FIG. 5B, it will be appreciated that the actual probability of an error (represented by the shaded area at 72) is less than that specified as the upper bound by the Tchebycheff inequality discussed above. Thus, useful, but non-ideal, embodiments of the present invention could be made in which lowpass filters 60, 60a, and 60b (FIGS. 3 and 3A) were omitted. In preferred forms of the present invention, lowpass filtering of either each magnitude error signal from the two constellation decision circuits, or the magnitude difference signal, by a finite impulse response filter of order n, n being an integer greater than 1, should be used.

In the Summary of the Invention above, it was noted that it was an object of the phase reference recovery apparatus of the present invention to provide a phase reference recovery circuit which allowed practical implementations of a fast turnaround modem using a signal constellation such as that specified in Recommendation V.29. From the foregoing description of the invention, the following should be appreciated. In the particular example of the preferred embodiment, the 9600 bit per second modem encodes 4 bits per baud and thus has a 2400 Hz baud rate. Thus, each baud time is on the order of 417 microseconds. Since use of finite impulse response filters which average the difference error signal over 5 baud times is the preferred embodiment of the invention, only 2.09 milliseconds is required after the phase lock loop has achieved lock in order to assure that the correct decision will be made within bounds constituting a fully acceptable bit error rate. Since the locking time for typical embodiments of phase lock loop 50 (FIG. 1) using this type of modem is on the order of 20 to 30 milliseconds, it will be appreciated that from the time a received signal is first applied to the receiver section, proper signal acquisition with a lock on the correct phase constellation can be achieved in a time on the order of 30 milliseconds. This is almost an order of magnitude smaller than the time required for the synchronization sequence specified in Recommendation V.29.

It should further be appreciated that the above described time between first application of the signal and reliable receipt of data also applies to any condition in which phase lock loop 50 (FIG. 1) loses lock, such as in response to a significant noise event in the data communications channel. Thus, while an error burst on the order of 50 to 80 bits may be encountered under such circumstances, a receiver circuit employing the present invention will reestablish lock on the correct phase constellation within the times described above without having to stop communication and requesting a synchronization sequence from the transmitting modem.

From the foregoing, it should be appreciated that the present invention meets the need and objects thereof described hereinabove. Also, from the foregoing description of the preferred embodiment, and the theoretical basis for the present invention, other embodiments of the present invention will suggest themselves to those skilled in the art. For example, it is clear that it is not necessary that the invention be used in an environment which includes an adaptive equalizer such as complex adaptive equalizer 26 shown in FIG. 1. The present invention's primary purpose is to quickly select the correct one of several possible local minima onto which a phase lock loop in a communications receiver may lock. Therefore, the present invention may be used in any communication scheme employing phase lock loops in which a plurality of rotated renditions of a signal constellation produce magnitude error signals, in the presence of Gaussian noise, which allow selection of the correct signal constellation to be made on the basis of the statistics of the difference error signals produced by decision circuits locked onto the various renditions of the constellation. Therefore, the scope of the present invention should be limited only by the claims below.

I claim:

1. In a data communications receiver, of the type comprising a data decoder and a phase locked loop comprising a loop filter, for receiving and decoding data encoded in a received baseband signal using a signal constellation consisting of a plurality of discrete points, each of said discrete points having a particular amplitude and a particular phase relative to a predetermined reference phase;
   an improved phase reference recovery circuit for detecting said predetermined reference phase in said received signal, comprising in combination:
   a first constellation decision circuit for providing a first detected data signal and a first magnitude error signal in response to said received baseband signal;
   phase shifting means for providing a shifted baseband signal in response to said received baseband signal, said shifted baseband signal having a phase which differs from the phase of said received baseband signal by a predetermined phase increment;
   a second constellation decision circuit for providing a second detected data signal and a second magnitude error signal in response to said shifted baseband signal;
   means for providing an angular error signal in response to a selected one of said received baseband signal and said shifted baseband signal;
   means for providing said angular error signal to said loop filter;
   comparator means for comparing said first and second magnitude error signals and for providing a selection signal in response to the relative values of said first and second magnitude error signals; and
   selection means connected to said comparator means and to said first and second constellation decision circuits for providing one of said first and second detected data signals to said data decoder in response to said selection signal.

2. A data communications receiver as recited in claim 1 wherein:
said comparator means comprises first and second low pass filters for low pass filtering said first and second magnitude error signals, respectively, to provide respective first and second filtered magnitude error signals; and
said comparator means provides said selection signal in response to the relative values of said first and second filtered magnitude error signals.

3. A data communications receiver as recited in claim 2 wherein:
each of said first and second low pass filters is a finite impulse response digital filter having a transfer function of $$H(z) = \sum_{k=0}^{k=n} z^{-k}$$

wherein n is an integer greater than zero.

4. A data communications receiver as recited in claim 3 wherein:
said integer n=5.

5. A data communications receiver as recited in claim 1 wherein:
said comparator means comprises an algebraic summing junction for providing an algebraic sum of said first and second magnitude error signals to provide a magnitude error difference signal;
a low pass filter for low pass filtering said magnitude error difference signal to provide a filtered magnitude error difference signal; and
said comparator means provides said selection signal in response to said filtered magnitude error difference signal being greater than a predetermined threshold value.

6. A data communications receiver as recited in claim 5 wherein:
said pass filter is a finite impulse response digital filter having a transfer function of $$H(z) = \sum_{k=0}^{k=n} z^{-k}$$

wherein n is an integer greater than zero.

7. A data communications receiver as recited in claim 6 wherein:
said integer n=5.

8. In a data communications receiver, of the type comprising a data decoder, a complex adaptive equalizer for providing an equalized baseband data signal in response to a received baseband data signal, and a phase locked loop comprising a loop filter, for receiving and decoding data encoded in said received baseband signal using a signal constellation consisting of a plurality of discrete points, each of said discrete points having a particular amplitude and a particular phase relative to a predetermined reference phase;
an improved phase reference recovery circuit for detecting said predetermined reference phase in said received signal, comprising in combination:
a first constellation decision circuit for providing a first detected data signal and a first complex error signal in response to said equalized baseband signal;
phase shifting means for providing a shifted baseband signal in response to said equalized baseband signal, said shifted baseband signal having a phase which differs from the phase of said equalized baseband signal by a predetermined phase increment;
a second constellation decision circuit for providing a second detected data signal and a second complex error signal in response to said shifted baseband signal;
means for providing an angular error signal in response to a selected one of said received baseband signal and said shifted baseband signal;
means for providing said angular error signal to said loop filter;
means for providing a first magnitude error signal in response to said first complex error signal and a second magnitude error signal in response to said second complex error signal;
comparator means for comparing said first and second magnitude error signals and for providing a selection signal in response to the relative values of said first and second magnitude error signals; and
selection means connected to said comparator means and to said first and second constellation decision circuits for providing one of said first and second detected data signals to said data decoder and one of said first and second complex error signals to said adaptive equalizer in response to said selection signal.

9. A data communications receiver as recited in claim 8 wherein:
said comparator means comprises first and second low pass filters for low pass filtering said first and second magnitude error signals, respectively, to provide respective first and second filtered magnitude error signals; and
said comparator means provides said selection signal in response to the relative values of said first and second filtered magnitude error signals.

10. A data communications receiver as recited in claim 9 wherein:
each of said first and second low pass filters is a finite impulse response digital filter having a transfer function of $$H(z) = \sum_{k=0}^{k=n} z^{-k}$$

wherein n is an integer greater than zero.

11. A data communications receiver as recited in claim 10 wherein:
said integer n=5.

12. A data communications receiver as recited in claim 8 wherein:
said comparator means comprises an algebraic summing junction for providing an algebraic sum of said first and second magnitude error signals to provide a magnitude error difference signal;
a low pass filter for low pass filtering said magnitude error difference signal to provide a filtered magnitude error difference signal; and
said comparator means provides said selection signal in response to said filtered magnitude error difference signal being greater than a predetermined threshold value.

13. A data communications receiver as recited in claim 12 wherein:
said pass filter is a finite impulse response digital filter having a transfer function of $$H(z) = \sum_{k=0}^{k=n} z^{-k}$$

wherein n is an integer greater than zero.

14. A data communications receiver as recited in claim 13 wherein:
said integer n=5.

15. A method of locking a data communications receiver onto a predetermined reference phase of received phase modulated signal of the type using a signal constellation consisting of a plurality of discrete points, each of said discrete points having a particular amplitude and a particular phase relative to said predetermined reference phase, comprising the steps of:
providing a phase locked loop with a loop filter;
providing a first constellation decision circuit which produces a first detected data signal and a first magnitude error signal in response to said received phase modulated signal;
providing a shifted phase modulated signal in response to said received phase modulated signal, said shifted phase modulated signal having a phase which differs from the phase of said received phase modulated signal by a predetermined phase increment;
providing a second constellation decision circuit which produces a second detected data signal and a second magnitude error signal in response to said shifted phase modulated signal;
providing an angular error signal in response to a selected one of said received phase modulated signal and said shifted phase modulated signal;
providing said angular error signal to said loop filter;
comparing said first and second magnitude error signals;
providing a selection signal in response to the relative values of said first and second magnitude error signals; and
selecting one of said first and second detected data signals and providing same to a data decoder in response to said selection signal.

16. A method of locking a data communications receiver onto a predetermined reference phase as recited in claim 15 wherein:
said step of comparing said first and second magnitude error signals includes a step of low pass filtering said first and second magnitude error signals.

17. A method of locking a data communications receiver onto a predetermined reference phase as recited in claim 15 wherein said step of comparing said first and second magnitude error signals includes the steps of:
providing a difference signal in response a difference of said first and second magnitude error signals; and
low pass filtering said difference signal.

18. A method of locking a data communications receiver onto a predetermined reference phase as recited in claim 15 wherein:
said step of comparing said first and second magnitude error signals includes a step of averaging said first and second magnitude error signals over a predetermined number of signal times of said received phase modulated signal.

19. A method of locking a data communications receiver onto a predetermined reference phase as recited in claim 15 wherein said step of comparing said first and second magnitude error signals includes the steps of:
providing a difference signal in response a difference of said first and second magnitude error signals; and
averaging said difference signal over a predetermined number of signal times of said received phase modulated signal.

* * * * *